(12) United States Patent
Huang et al.

(10) Patent No.: US 11,917,955 B2
(45) Date of Patent: *Mar. 5, 2024

(54) APPARATUS, SYSTEMS AND METHODS FOR IRRIGATING LANDS

(71) Applicant: Taiwan Semiconductor Manufacturing Co., Ltd., Hsin-Chu (TW)

(72) Inventors: Ting-Cheng Huang, Hsin-Chu (TW); Tai-Hua Yu, Hsin-Chu (TW); Shui-Ting Yang, Hsin-Chu (TW); Chao-Te Lee, Hsin-Chu (TW); Ching Rong Lu, Hsin-Chu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/370,799

(22) Filed: Jul. 8, 2021

(65) Prior Publication Data

US 2021/0329861 A1    Oct. 28, 2021

Related U.S. Application Data

(63) Continuation of application No. 16/585,753, filed on Sep. 27, 2019, now Pat. No. 11,058,074.

(60) Provisional application No. 62/742,738, filed on Oct. 8, 2018.

(51) Int. Cl.
*E02B 11/00* (2006.01)
*A01G 25/16* (2006.01)
*E02B 13/02* (2006.01)

(52) U.S. Cl.
CPC .......... *A01G 25/16* (2013.01); *A01G 25/167* (2013.01); *E02B 13/02* (2013.01)

(58) Field of Classification Search
CPC ...... A01G 25/16; A01G 25/167; A01G 25/06; E02B 13/02; E02B 11/00; E02B 11/005; E02B 13/00; Y02P 60/12; Y10T 137/1866; Y10T 137/402; Y10T 137/189
See application file for complete search history.

(56) References Cited

U.S. PATENT DOCUMENTS

| | | | | |
|---|---|---|---|---|
| 3,590,335 | A * | 6/1971 | Tetar | A01G 25/16 361/178 |
| 3,599,867 | A * | 8/1971 | Griswold | A01G 25/162 239/DIG. 15 |
| 4,232,707 | A * | 11/1980 | Sturman | A01G 25/162 307/41 |
| 4,934,400 | A * | 6/1990 | Cuming | A01G 25/165 239/70 |
| 4,992,942 | A * | 2/1991 | Bauerle | A01G 31/00 706/930 |
| 5,097,861 | A * | 3/1992 | Hopkins | A01G 25/16 239/69 |

(Continued)

*Primary Examiner* — Edwin J Toledo-Duran
(74) *Attorney, Agent, or Firm* — Duane Morris LLP

(57) ABSTRACT

Apparatus, systems and methods for irrigating lands are disclosed. In one example, an irrigation system is disclosed. The irrigation system includes a gate and a microcontroller unit (MCU). The gate is configured for adjusting a water flow for irrigating a piece of land. The MCU is configured for controlling the gate to adjust the water flow based on environmental information related to the piece of land.

20 Claims, 10 Drawing Sheets

(56) References Cited

U.S. PATENT DOCUMENTS

| | | | | |
|---|---|---|---|---|
| 5,870,302 A * | 2/1999 | Oliver | A01G 25/167 | 239/69 |
| 9,581,264 B1 * | 2/2017 | Ericksen | F16K 27/003 | |
| 10,015,938 B1 * | 7/2018 | Malsam | C05G 3/50 | |
| 10,039,242 B1 * | 8/2018 | Goldwasser | H02S 99/00 | |
| 2002/0066484 A1 * | 6/2002 | Stringam | A01G 25/16 | 137/392 |
| 2004/0140902 A1 * | 7/2004 | Staples | A01G 25/167 | 340/602 |
| 2005/0187665 A1 * | 8/2005 | Fu | A01G 25/167 | 239/69 |
| 2006/0044132 A1 * | 3/2006 | Ancel | G06Q 10/08 | 340/8.1 |
| 2009/0281672 A1 * | 11/2009 | Pourzia | A01G 25/167 | 700/284 |
| 2010/0023173 A1 * | 1/2010 | Wu | A01G 25/16 | 700/284 |
| 2010/0082170 A1 * | 4/2010 | Wilson | A01G 25/16 | 700/284 |
| 2010/0139160 A1 * | 6/2010 | Hirsh | A01G 27/008 | 47/65.5 |
| 2011/0111700 A1 * | 5/2011 | Hackett | H04W 72/23 | 455/41.2 |
| 2011/0273196 A1 * | 11/2011 | Hill | A01G 25/167 | 324/696 |
| 2012/0053706 A1 * | 3/2012 | Mukter-Uz-Zaman | G08C 17/00 | 700/90 |
| 2012/0097253 A1 * | 4/2012 | Eutsler | E03B 7/12 | 137/79 |
| 2012/0152012 A1 * | 6/2012 | Aughton | G01N 33/246 | 73/152.18 |
| 2013/0317766 A1 * | 11/2013 | Decker | G01F 23/804 | 73/304 C |
| 2014/0365021 A1 * | 12/2014 | Workman | A01G 25/16 | 324/546 |
| 2014/0373926 A1 * | 12/2014 | Jha | G01N 33/18 | 702/182 |
| 2015/0164008 A1 * | 6/2015 | Ferrer Herrera | A01G 25/16 | 251/129.04 |
| 2015/0167861 A1 * | 6/2015 | Ferrer Herrera | A01G 25/16 | 137/554 |
| 2015/0351337 A1 * | 12/2015 | Sabadin | F16K 31/042 | 700/282 |
| 2015/0377811 A1 * | 12/2015 | Mitchell | G01N 15/0656 | 73/61.77 |
| 2016/0048135 A1 * | 2/2016 | Hill | G05B 19/042 | 405/37 |
| 2017/0030877 A1 * | 2/2017 | Miresmailli | A01M 21/043 | |
| 2017/0181389 A1 * | 6/2017 | Jain | A01B 79/005 | |
| 2017/0311559 A1 * | 11/2017 | Ebert | A01G 17/02 | |
| 2018/0129338 A1 * | 5/2018 | Ihalainen | F16K 31/122 | |
| 2018/0149286 A1 * | 5/2018 | Ihalainen | G06F 3/0383 | |
| 2019/0271656 A1 * | 9/2019 | Pruessner | G01N 33/246 | |
| 2020/0101480 A1 * | 4/2020 | Schrader | A01M 7/0089 | |
| 2020/0107507 A1 * | 4/2020 | Huang | A01G 25/16 | |
| 2020/0284374 A1 * | 9/2020 | Heaney | B05B 3/0436 | |

* cited by examiner

APPARATUS, SYSTEMS AND METHODS FOR IRRIGATING LANDS

CROSS-REFERENCE TO RELATED APPLICATIONS

The present application is a continuation of U.S. patent application Ser. No. 16/585,753, filed on Sep. 27, 2019, which claims priority to U.S. Provisional Patent Application No. 62/742,738, filed on Oct. 8, 2018, each of which is incorporated by reference herein in its entirety.

BACKGROUND

Irrigation can help to grow agricultural crops, maintain landscapes, and revegetate disturbed soils in dry areas and during periods of less than average rainfall. Existing irrigation systems are based on manual operation and have a high risk of personnel safety to operate when the climate is not good. The irrigation gates based on manual operation cannot effectively control the amount of irrigation water.

Current automatic irrigation systems, however, have some drawbacks. For example, an existing automatic irrigation system is based on programmable logic controllers, which requires an independent wired power source for each module of the existing automatic irrigation system. This increases the installation cost as well as the cost for maintaining the existing automatic irrigation system. In addition, gates of an existing automatic irrigation system are very bulky and expensive, which also increases the power consumption and cost for installation and maintenance of the existing automatic irrigation system. As such, systems and methods for irrigating lands to solve the above mentioned problems is desired.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion. Like reference numerals denote like features throughout specification and drawings.

DETAILED DESCRIPTION

Figure 1:
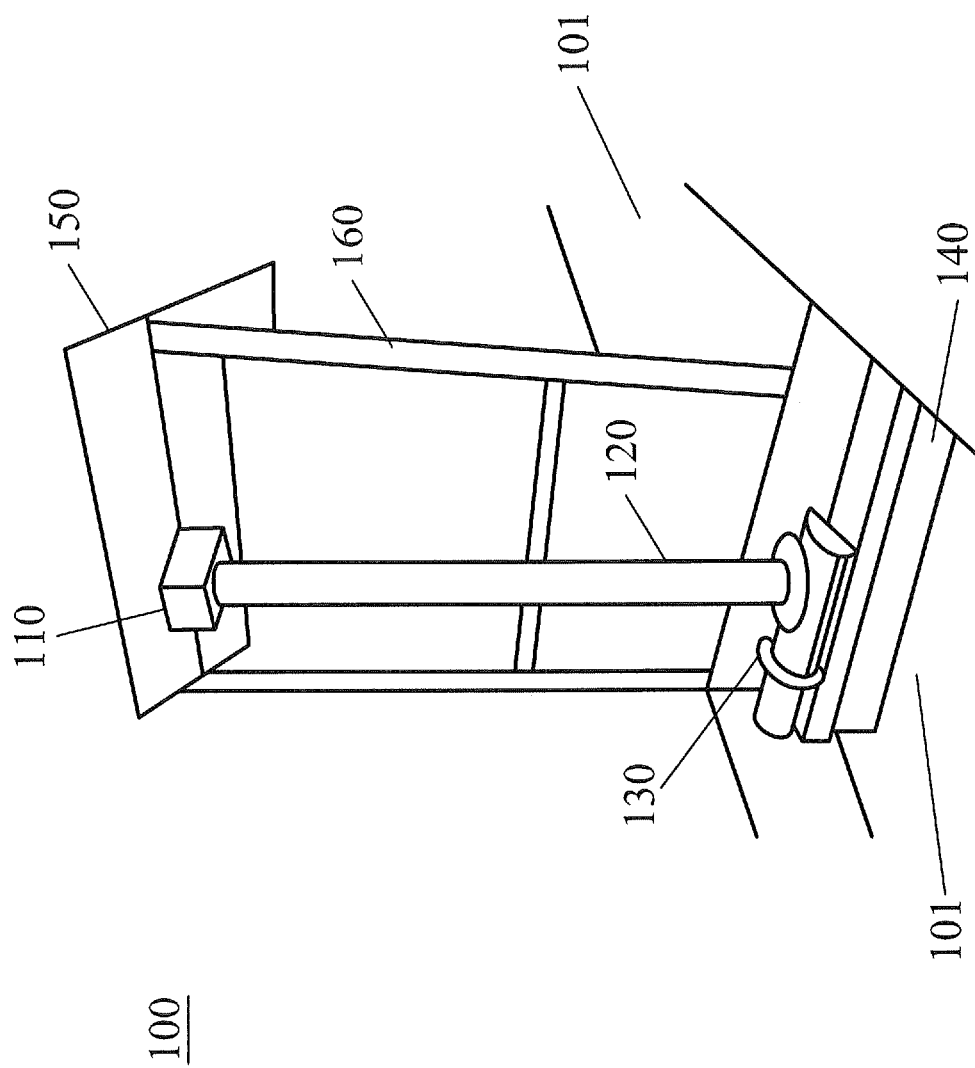
FIG. 1 illustrates a front view of an exemplary irrigation system, in accordance with some embodiments of the present disclosure.

The following disclosure describes various exemplary embodiments for implementing different features of the subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Terms such as "attached," "affixed," "connected" and "interconnected," refer to a relationship wherein structures are secured or attached to one another either directly or indirectly through intervening structures, as well as both movable or rigid attachments or relationships, unless expressly described otherwise.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference will now be made in detail to the present embodiments of the disclosure, examples of which are illustrated in the accompanying drawings. Wherever possible, the same reference numbers are used in the drawings and the description to refer to the same or like parts.

In the present teaching, a new irrigation system is disclosed based on the Internet of Things (IoT) technology. The disclosed irrigation system can generate feedback data related to farmland's conditions, and then adjust the amount of irrigation water based on these data automatically. The system's operation and monitoring signal transmission can be driven by green energy, with low power consumption modules.

In one embodiment, farmland environmental status is automatically detected for irrigation gate operation based on one or more sensors coupled to a microcontroller unit (MCU), instead of human eyes. The irrigation gate is controlled by the MCU to open or close to a certain degree of openness, i.e. to adjust the water flow for irrigating a piece of land, based on environment information related to the piece of land. The environmental information may include an air temperature; an air humidity; a soil moisture; an air pressure; a wind power; and/or a water level of the piece of land.

The disclosed system may include an elevator configured for moving the gate; and a low-power motor configured for driving the elevator. The MCU may have a communication module configured for wirelessly transmitting the environmental information to a remote server and wirelessly receiving an instruction from the remote server, e.g. based on long range wide area network (LoRaWAN) or narrow band-Internet of Things (NB-IoT). In one embodiment, the instruction is determined by the remote server based on the environmental information related to the piece of land and environmental information related to other pieces of land associated with the irrigation system. The MCU may further include a sensor configured for detecting a degree of openness of the gate based on either ultrasound or laser; and a controller configured for controlling an openness of the gate based on the degree of openness and the instruction from the remote server.

The disclosed irrigation system has a gate smaller than traditional electric gates and induces a lower installation cost. The system improves the efficiency of water usage by objectively judging and controlling the amount of irrigation water. Based on IoT technology, the system remotely controls an irrigation equipment without a need of human intervention.

FIG. 1 illustrates a front view of an exemplary irrigation system 100, in accordance with some embodiments of the present disclosure. The irrigation system 100 includes a gate 140 configured for adjusting a water flow 101 for irrigating a piece of land; and a microcontroller unit (MCU) 110 configured for controlling the gate 140 to adjust the water flow 101 based on environmental information related to the piece of land.

As shown in FIG. 1, the water flow 101 is within a water channel under the gate 140. The water channel is connected to the piece of land, such that adjusting the water flow 101 means adjusting an amount of water to be irrigated to the piece of land. According to various embodiments, the gate 140 may be either a swing gate or a slide gate. By having different degrees of openness, the gate 140 can adjust the amount of the water flow 101 going through the gate 140.

As shown in FIG. 1, the irrigation system 100 further includes an elevator 120 configured for moving the gate 140; and a motor 130 configured for driving the elevator 120. The gate 140 in this example is coupled to the elevator 120 and can be moved by the elevator 120 up and down to achieve a target openness. The target openness is based on environmental information related to the piece of land to be irrigated. The MCU 110 in this example is coupled to the elevator 120 and can obtain an instruction from a remote server about the target openness determined based on the environmental information. In addition, the MCU 110 can detect a current openness of the gate 140, e.g. based on laser or ultrasound, and determine how to control the elevator 120 to move the gate 140 based on the current openness and the target openness.

In one embodiment, the elevator 120 and the motor 130 are designed to have a low power-to-weight ratio. In one example, the power-to-weight ratio is less than about 0.05 W/kg. In another example, the power-to-weight ratio is less than about 0.01 W/kg. As shown in FIG. 1, the motor 130 in this example is coupled to the elevator 120 and can drive the elevator 120 to move the gate 140. In one embodiment, the energy source for the motor 130 is the solar power obtained via a solar panel system 150. The solar panel system 150 is coupled to a frame 160 which is further coupled to the elevator 120 and the motor 130.

Figure 2:
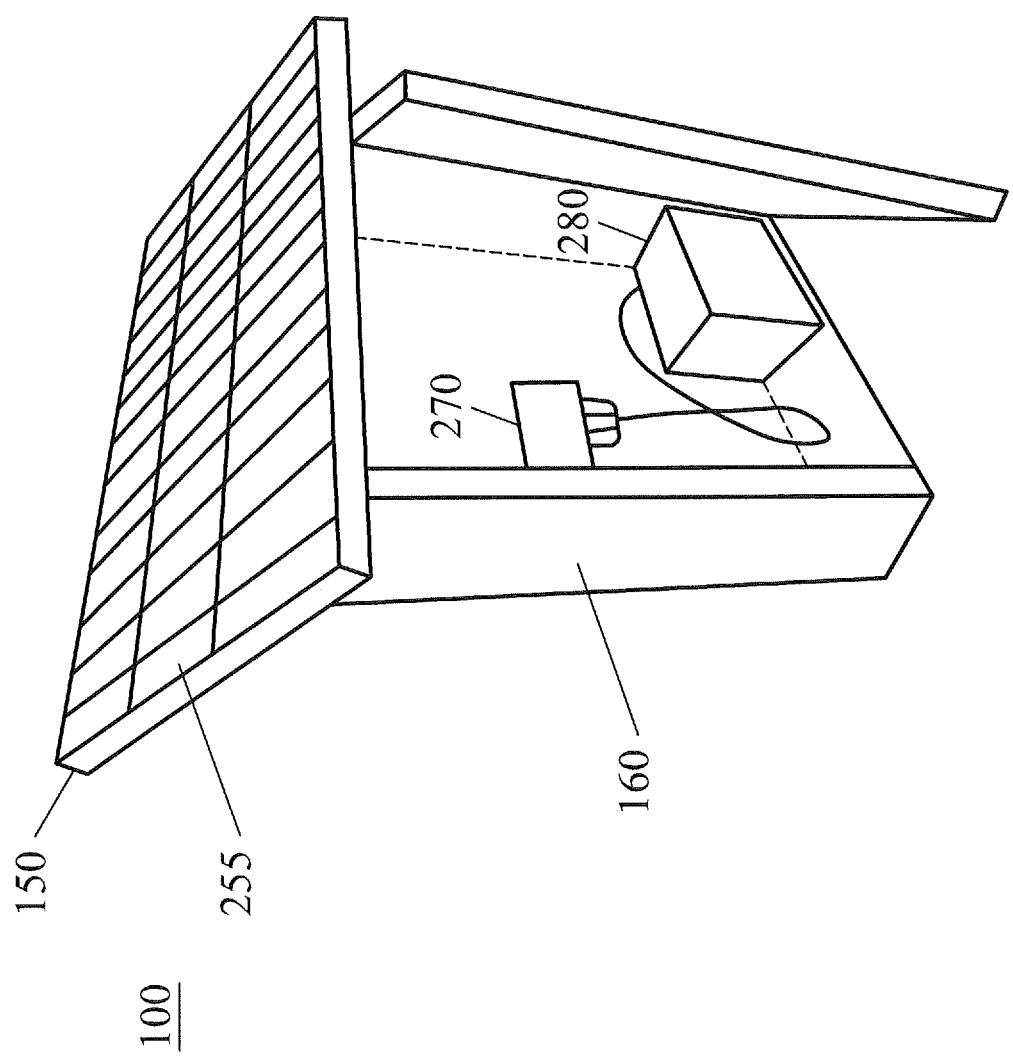
FIG. 2 illustrates a back view of an exemplary irrigation system, in accordance with some embodiments of the present disclosure.

FIG. 2 illustrates a back view of an exemplary irrigation system 100, e.g. the irrigation system 100 in FIG. 1, in accordance with some embodiments of the present disclosure. As shown in FIG. 2, the irrigation system 100 in this example includes a solar panel system 150 and a battery 280 charged with energy from the solar panel system 150. The solar panel system 150 may include one or more solar panels 255 each of which can absorb sunlight as a source of energy to generate electricity energy and store the electricity energy into the battery 280, e.g. via a charger 270 between the solar panel system 150 and the battery 280.

As shown in FIG. 2, the solar panel system 150, the charger 270 and the battery 280 are coupled to the frame 160. The battery 280 can provide energy to the motor 130 and the MCU 110. In one embodiment, the battery 280, when fully charged, is capable of providing energy to the motor 130 and the MCU 110 for at least 12 hours. This is enough for a low power-to-weight ratio motor as described above. In this manner, green energy is efficiently used to move the gate and irrigate the land. In one embodiment, when the battery 280 runs out of power, it can also be manually charged by an external power source.

Figure 3:
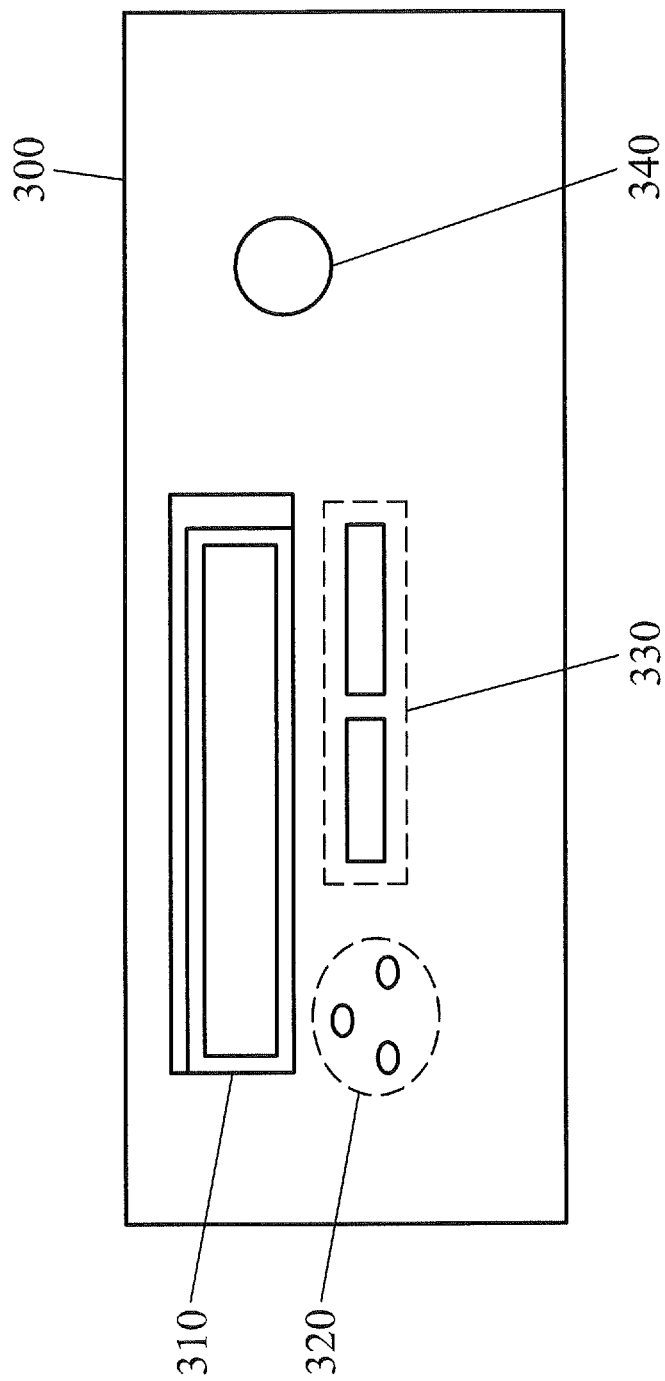
FIG. 3 illustrates a microcontroller unit of an exemplary irrigation system, in accordance with some embodiments of the present disclosure.

FIG. 3 illustrates a microcontroller unit (MCU) 300 of an exemplary irrigation system, e.g. the irrigation system 100 in FIG. 1 and FIG. 2, in accordance with some embodiments of the present disclosure. In this example, the MCU 300 includes a displayer 310, one or more sensors 320, a controller 330, and a communication module 340. The MCU 300 consumes much less power than a conventional programmable logic controller (PLC). As such, the MCU 300 does not need to be wire-connected to an external power source as the PLC, and can be charged with the solar panel system 150 and the internal battery 280.

The displayer 310 can display a status or degree of openness of the gate 140. In one embodiment, the MCU 300 includes a sensor configured for detecting a degree of openness of the gate 140 based on either ultrasound or laser. In one example, when the length of the elevator 120 is less than 90 cm, ultrasound is used to detect the degree of openness of the gate 140. In another example, when the length of the elevator 120 is not less than 90 cm, laser is used to detect the degree of openness of the gate 140.

The one or more sensors 320 in this example are configured for detecting the environmental information related to the piece of land, e.g. temperature, humidity, air pressure, etc. The communication module 340 in this example is configured for wirelessly transmitting the environmental information to a remote server and wirelessly receiving an instruction from the remote server. The instruction is determined by the remote server based on the environmental information related to the piece of land and environmental information related to other pieces of land associated with the irrigation system 100.

The controller 330 in this example is configured for controlling an openness of the gate 140 based on the current degree of openness of the gate 140 and the instruction from the remote server. That is, the controller 330 may control the gate to be moved from a current openness to a target openness based on the instruction. For example, when the gate 140 has a current openness of 50% and a target openness of 80% based on the instruction, the controller 330 may control the motor 130 to drive the elevator 120 to further open the gate 140. During the movement of the gate 140, the MCU 300 detects the openness of the gate 140 in real-time, based on either ultrasound or laser. Once the MCU 300 detects that the openness of the gate 140 arrives at the target openness 80%, the controller 330 will control the motor 130 to stop driving the elevator 120, such that the gate 140 is moved to and fixed at the target openness 80%.

Figure 4:
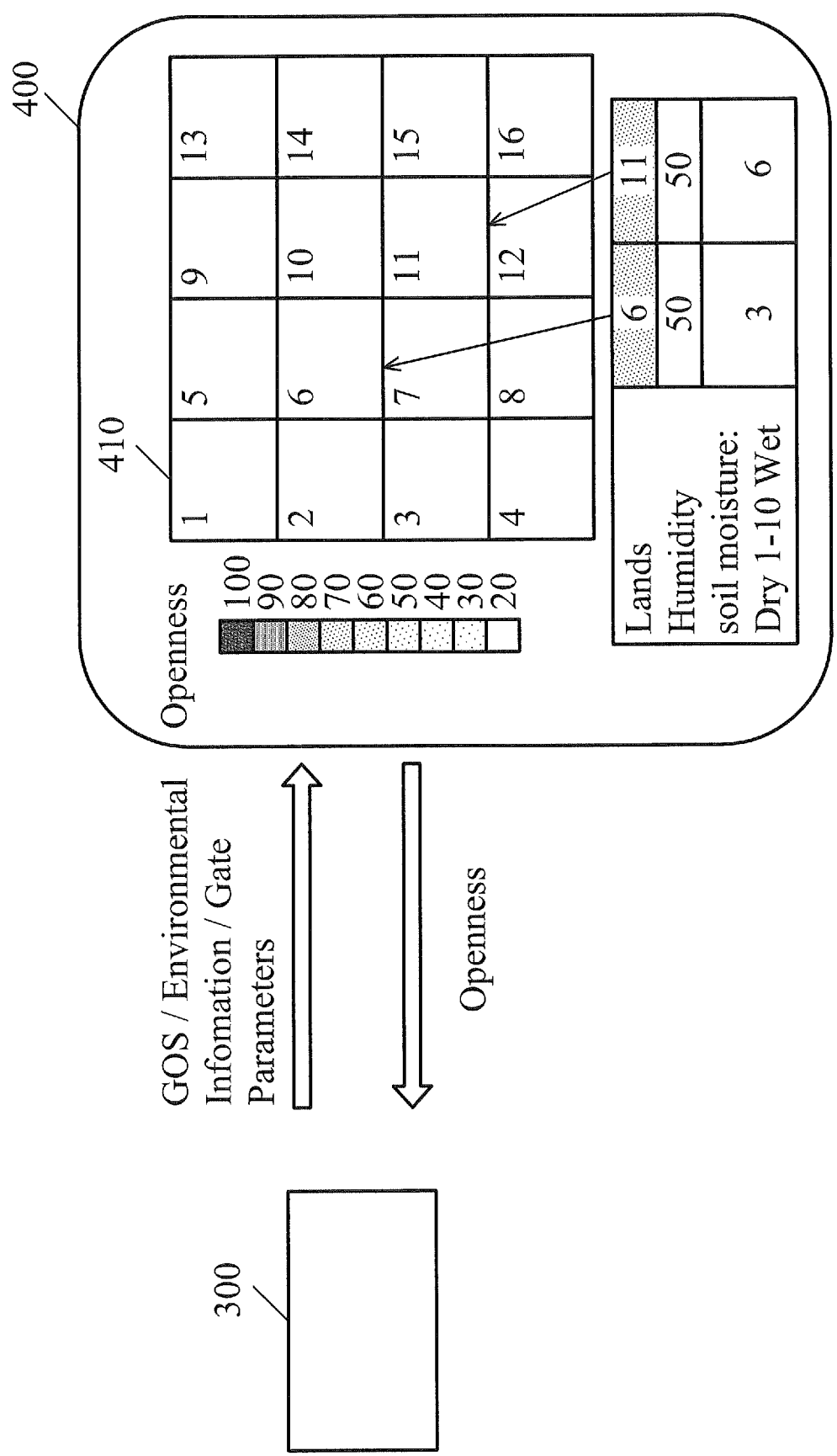
FIG. 4 illustrates a communication mechanism between a microcontroller unit and a remote server, in accordance with some embodiments of the present disclosure.

FIG. 4 illustrates a communication mechanism between a microcontroller unit (MCU) 300, e.g. the MCU 300 in FIG. 3, and a remote server 400, in accordance with some embodiments of the present disclosure. As discussed above, the MCU 300 includes a 340 for communicating with the remote server 400. The communication module 340 may communicate with the remote server 400 based on a low-power communication technology, e.g. long range wide area network (LoRaWAN) or narrow band-Internet of Things (NB-IoT). In one embodiment, the remote server 400 may be treated as part of the irrigation system 100.

In one embodiment, the MCU 300 can transmit to the remote server 400 various environmental information related to the piece of land, including but not limited to: an air temperature; an air humidity; a soil moisture; an air pressure; a wind power; and a water level. In addition, the MCU 300 may also transmit to the remote server 400 location information (e.g. GPS location) related to the piece of the land and gate parameters of the gate 140.

In one embodiment, the remote server 400 may be associated with a plurality of pieces of land to be irrigated by the irrigation system 100. The irrigation system 100 in this embodiment includes a plurality of gates each of which is configured for adjusting a water flow for irrigating a respective one of the plurality of pieces of land. Each of the plurality of gates is either a swing gate or a slide gate. The irrigation system 100 in this embodiment also includes a plurality of control units each of which is configured for controlling a respective one of the plurality of gates to adjust the water flow based on environmental information related to the plurality of pieces of land. Each of the plurality of control units has a radio-frequency identification (RFID) for a local user to control irrigation of a respective one of the plurality of pieces of land.

As shown in FIG. 4, there are 16 pieces of land associated with the irrigation system 100 in this example. In addition to the environmental information, gate parameters and the location information, the MCU 300 may also transmit its identity, e.g. a land ID or RFID, to the remote server 400. The remote server 400 is coupled to a remote monitor 410 that monitors the environmental information related to the plurality of pieces of land and received from the plurality of control units in real-time. Based on the environmental information related to the plurality of pieces of land, the remote server 400 may determine a reasonable distribution of irrigation water among the plurality of pieces of land, and further determine a target openness, e.g. in terms of %, for each piece of land in the next time period, which may be a minute, an hour, a day, a week, etc.

The remote server 400 will transmit a target openness to the MCU 300 depending on the land ID associated with the MCU 300. In the example shown in FIG. 4, lands 6 and 11 both have a humidity of 50. But land 6 has a soil moisture degree of 3, and land 11 has a soil moisture degree of 6, where soil moisture degree here is from 1 meaning most dry and 10 meaning most wet. As such, the remote server 400 will determine to distribute more water to irrigate land 6 than that to irrigate land 11. That is, the remote server 400 will transmit a relatively higher target openness to the MCU 300 associated with land 6, and transmit a relatively lower target openness to the MCU 300 associated with land 11.

Figure 5:
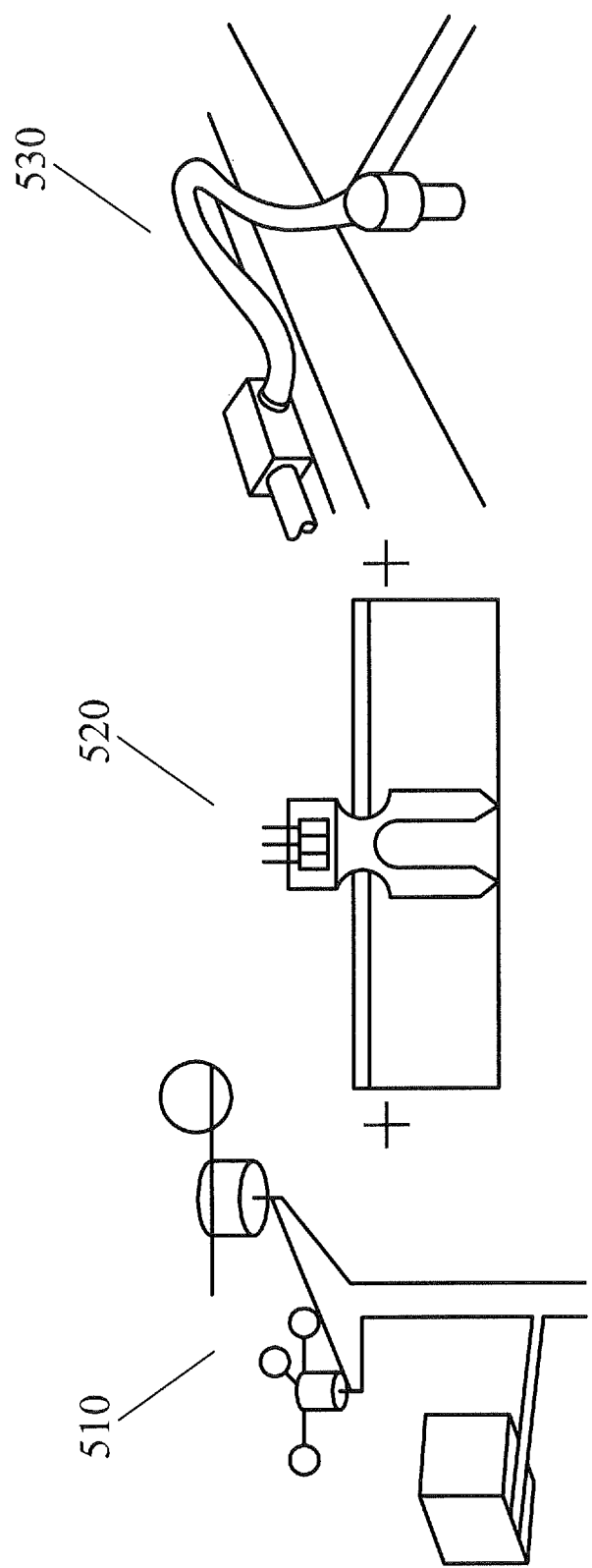
FIG. 5 illustrates various sensors of an exemplary irrigation system, in accordance with some embodiments of the present disclosure.

FIG. 5 illustrates various sensors of an exemplary irrigation system, e.g. the irrigation system 100 in FIG. 1 and FIG. 2, in accordance with some embodiments of the present disclosure. As discussed above, the irrigation system 100 may include various sensors for sensing environmental information related to the piece of land, including but not limited to: an air temperature; an air humidity; a soil moisture; an air pressure; a wind power; and a water level. As such, the environmental conditions and current irrigation conditions of the local farmland are monitored in real-time, such that the irrigation water volume for the local farmland can be adjusted automatically in real-time.

As shown in FIG. 5, the irrigation system 100 may include or be coupled to a micro weather station 510 configured for detecting air temperature, air humidity, air pressure, and wind power. The air temperature and the air humidity are directly related to the irrigation water volume. In addition, based on the wind power and the air pressure, the system can determine proper and likely types of agricultural crops growing in that piece of land. The system may determine a target openness of the irrigation gate based on the type of agricultural crop in addition to other factors.

As shown in FIG. 5, the irrigation system 100 may also include or be coupled to a soil moisture measurer 520 configured for measuring a soil moisture degree of the local farmland; and a water level gauge 530 for measuring a water level of the local farmland based on either ultrasound or laser. Each of the micro weather station 510, the soil moisture measurer 520 and the water level gauge 530 may communicate with the remove server via IoT technology directly based on their respective MCU, or through an integrated MCU 110. As such, environmental information is remotely monitored and the irrigation is correspondingly controlled remotely, with a low power consumption scheme.

Figure 6:
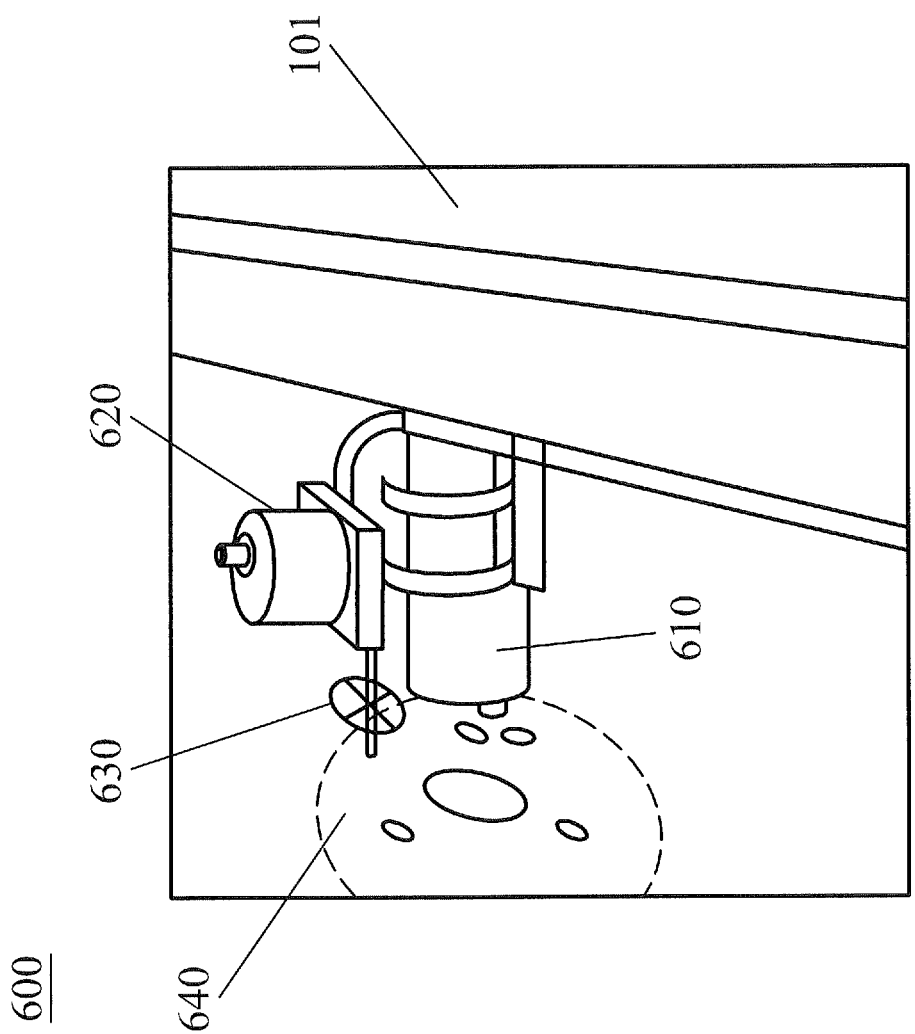
FIG. 6 illustrates a water valve of an exemplary irrigation system, in accordance with some embodiments of the present disclosure.

FIG. 6 illustrates a motor driven water valve 600 of an exemplary irrigation system, e.g. the irrigation system 100 in FIG. 1 and FIG. 2, in accordance with some embodiments of the present disclosure. In this embodiment, the piece of land to be irrigated is a farm that includes a plurality of areas connected with a water channel. The water channel has a water flow 101 that is adjustable by the gate 140. Each area 640 in this example is connected to the water channel via a motor driven water valve 600 which is configured for irrigating the area 640 using water from the water channel based on a water level of the area 640. In this example, the motor driven water valve 600 includes a motor 620, a valve 610 and a manual switch 630. The motor 620 can drive and control an openness of the valve 610 to induce the water flow 101 into the area 640, based on the water level of the area 640. The water level of the area 640 may be measured by a water level gauge coupled to the motor driven water valve 600. In one embodiment, the openness of the valve 610 may also be remotely monitored and controlled by the remote server. The manual switch 630 may be used to manually control the openness of the valve 610 to induce the water flow 101 to irrigate the area 640, when e.g. the local farmland owner disagrees with the assigned target openness to the valve 610.

Figure 7:
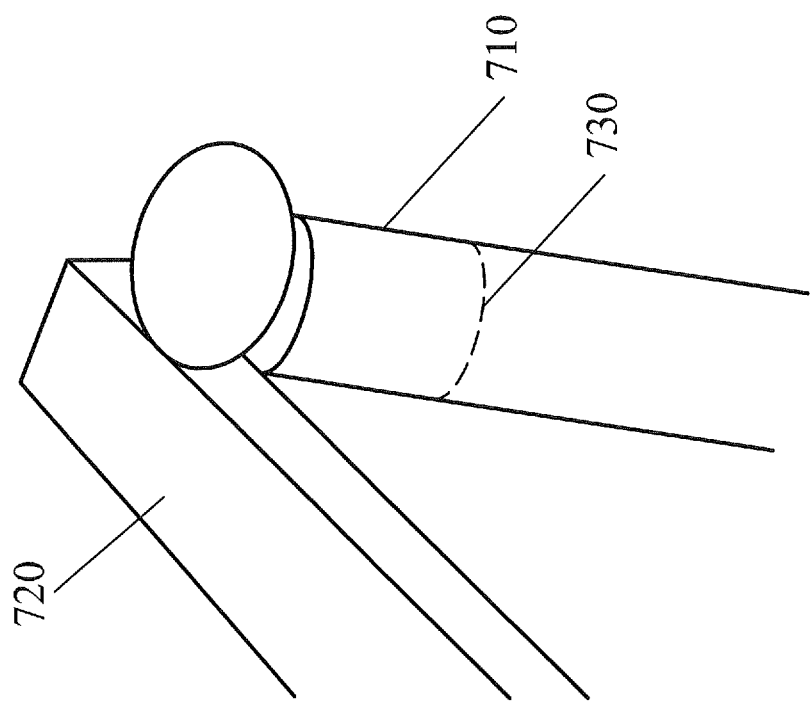
FIG. 7 illustrates a water level gauge coupled to a water valve of an exemplary irrigation system, in accordance with some embodiments of the present disclosure.

FIG. 7 illustrates a water level gauge 700 coupled to a water valve of an exemplary irrigation system, e.g. the motor driven water valve 600 in FIG. 6, in accordance with some embodiments of the present disclosure. As shown in FIG. 7, the water level gauge 700 includes a measurement tube 710 and a connector 720 coupled to the measurement tube 710. The measurement tube 710 can measure a water level 730 of the area 640 based on either ultrasound or laser. The measured water level 730 can be used by the motor driven water valve 600 to control irrigation water volume of the area 640.

Figure 8A:
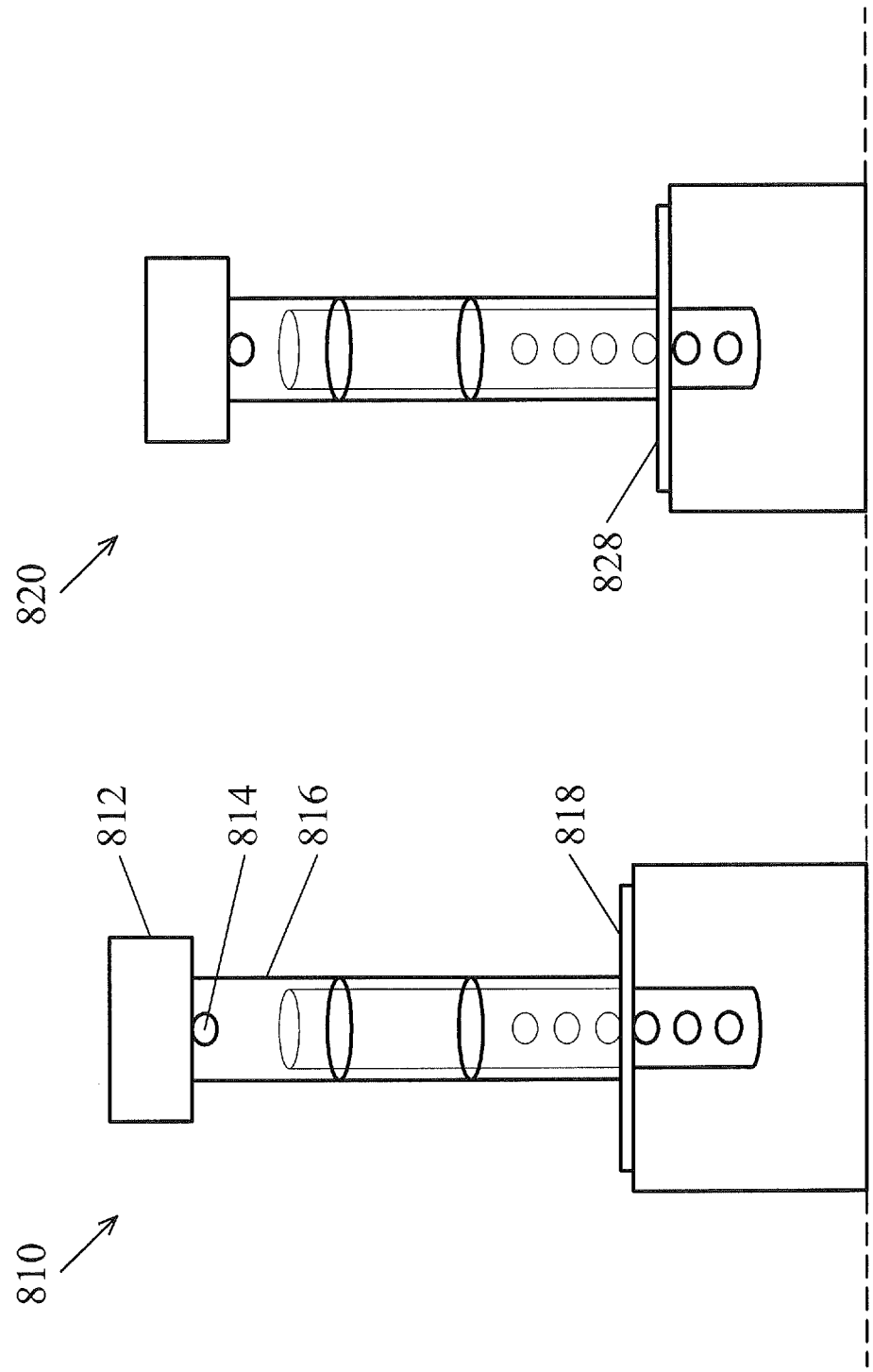
FIG. 8A is a perspective view of a water level gauge, in accordance with some embodiments of the present disclosure.

FIG. 8A is a perspective view of a water level gauge 810, 820, in accordance with some embodiments of the present disclosure. Farmland crops need to be replenished and discharged several times. Based on the release of the water, the roots of the crops will protrude deeper down in order to find the water source, so that the wind resistance and nutrient absorption are enhanced. As the water level rises and falls, the plasticity of the clay and fine sand in the soil may change, causing the soil surface height to drop. While a traditional liquid level gauge can only measure the water level or liquid level based on a fixed height of the soil, its measurement will have a height error as time goes by, which causes waste of water. For example, while a traditional gauge has an initial measurement of the liquid level above the soil by 3 cm, after 3 months, the soil level will decrease, such that the same liquid level reading will become a liquid level above the soil by 6 cm.

In this example, the water level gauges 810, 820 illustrate status of a same proposed water level gauge at different time periods. The proposed water level gauge has a soil surface aligner configured for detecting a surface level of soil in the area. The water level of the area is measured based on the surface level, which avoids the soil height error of a traditional gauge.

As shown in FIG. 8A, the water level gauge 810 includes an IoT based level gauge 812, a waterproof vent 814, an outer tube 816, and a soil surface aligner 818. The soil surface aligner 818 in this example may be a horizontal ring that moves up or down with the soil surface. As shown in FIG. 8A, as time goes by from 810 to 820, the soil surface aligner 818 in contact with the soil surface becomes the soil surface aligner 828 which is still in contact with the soil surface.

In one embodiment, after the water level gauge 810 detects a surface level of soil in an area within the piece of land, the water level gauge 810 measures a water level of the area based on the surface level, and informs the motor driven water valve 600 about the water level. The motor driven water valve 600 then can irrigate the area using the adjusted water flow based on the water level. An ultraviolet (UV) light-emitting diode (LED) light (not shown) may be located at the top of the IoT based level gauge 812, to provide light or indication without attracting insects. One or more solar panels may be attached to the water level gauge 810 to provide energy to the UV LED light.

Figure 8B:
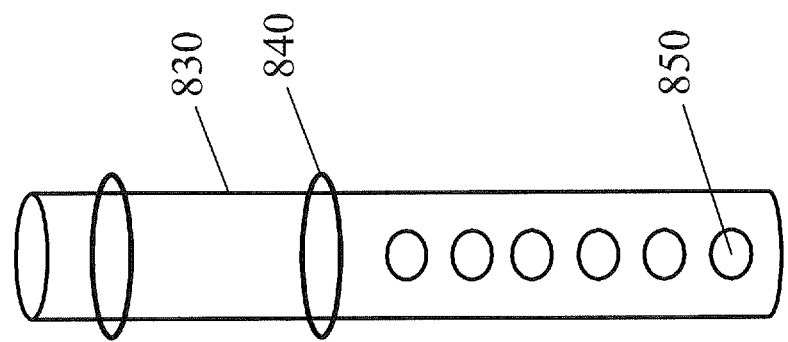
FIG. 8B illustrates an inner tube inside the water level gauge of FIG. 8A, in accordance with some embodiments of the present disclosure.

FIG. 8B illustrates an inner tube 830 inside the water level gauge 810 of FIG. 8A, in accordance with some embodiments of the present disclosure. As shown in FIG. 8B, the inner tube 830 includes an insect resistance ring 840, e.g. with bristles, and holes 850 for taking water for measurement. In one embodiment, a high breathable tape is attached to the waterproof vent 814 of the water level gauge, to generate air damping or suspension to avoid the water level misjudgment caused by water waves.

Figure 9:
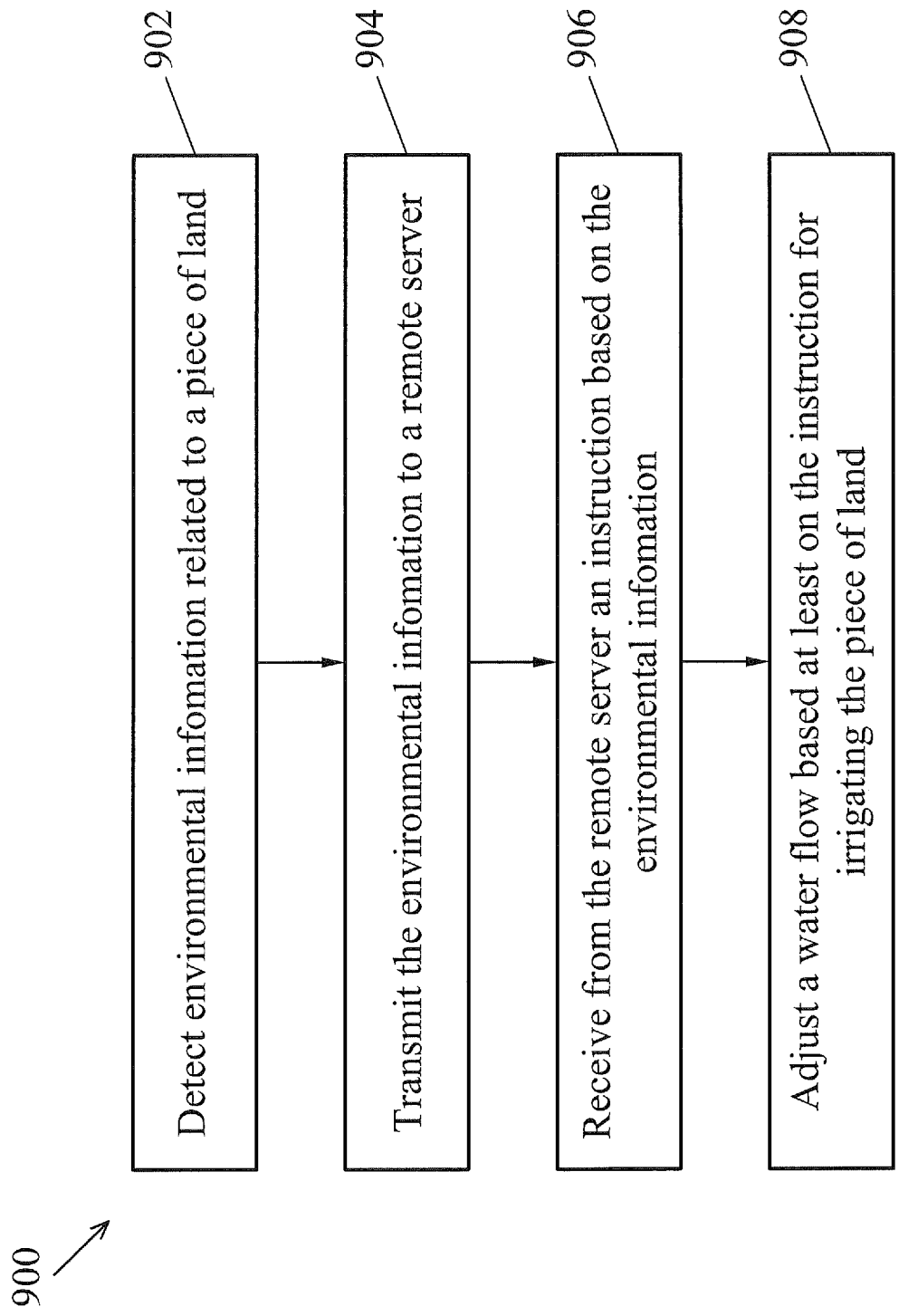
FIG. 9 is a flow chart illustrating an exemplary method for irrigating a piece of land using an exemplary irrigation system, in accordance with some embodiments of the present disclosure.

FIG. 9 is a flow chart illustrating an exemplary method 900 for irrigating a piece of land using an exemplary irrigation system, in accordance with some embodiments of the present disclosure. As operation 902, environmental information related to a piece of land is detected. The environmental information is transmitted to a remote server at operation 904. At operation 906, an instruction based on the environmental information is received from the remote server. At operation 908, a water flow is adjusted based at least on the instruction for irrigating the piece of land. The order of the operations shown in FIG. 9 may be changed according to different embodiments of the present disclosure.

The instruction may be determined by the remote server based on the environmental information related to the piece of land and environmental information related to other pieces of land associated with the remote server. In one embodiment, adjusting the water flow includes: detecting a degree of openness of a gate for the water flow; and controlling, based on the degree of openness and the instruction, an openness of the gate to adjusting the water flow.

In an embodiment, an irrigation system is disclosed. The irrigation system includes a gate and a microcontroller unit (MCU). The gate is configured for adjusting a water flow for irrigating a piece of land. The MCU is configured for controlling the gate to adjust the water flow based on environmental information related to the piece of land.

In another embodiment, an irrigation system for irrigating a plurality of pieces of land is disclosed. The irrigation system includes a plurality of gates and a plurality of control units. Each of the plurality of gates is configured for adjusting a water flow for irrigating a respective one of the plurality of pieces of land. Each of the plurality of control units is configured for controlling a respective one of the plurality of gates to adjust the water flow based on environmental information related to the plurality of pieces of land.

In yet another embodiment, a method for irrigating a piece of land is disclosed. The method includes: detecting environmental information related to the piece of land; transmitting the environmental information to a remote server; receiving an instruction from the remote server; and adjusting a water flow based at least on the instruction for irrigating the piece of land.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An irrigation system, comprising:
a gate configured to adjust a water flow for irrigating a farm that includes a plurality of areas connected with a water channel, wherein the water channel has a water flow that is adjustable by the gate;
a control unit configured to control the gate to adjust the water flow based on environmental information related to the farm, wherein the control unit is a microcontroller unit (MCU) comprising at least one sensor contained within the MCU, and wherein the at least one sensor comprises a laser sensor configured to detect a degree of openness of the gate;
a plurality of water level gauges each of which is configured to measure a water level of a respective one of the plurality of areas; and
a plurality of water valves each of which is configured to irrigate a respective one of the plurality of areas using water from the water channel based on the water level,
wherein at least one of the plurality of water level gauges has a surface aligner configured to detect a surface level of the Earth in the respective one of the plurality of areas, wherein the water level of the respective one of the plurality of areas is measured based on the surface level.

2. The irrigation system of claim 1, further comprising:
an elevator configured to move the gate; and
a motor configured to drive the elevator, wherein the elevator and the motor are designed to have a power-to-weight ratio less than about 0.05 W/kg.

3. The irrigation system of claim 2, wherein the elevator and the motor are designed to have a power-to-weight ratio less than about 0.01 W/kg.

4. The irrigation system of claim 2, further comprising:
a solar panel; and
a battery charged with energy from the solar panel, wherein the battery, when fully charged, is capable of providing energy to the motor and the control unit for at least 12 hours.

5. The irrigation system of claim 1, wherein the control unit comprises:
a communication module configured to wirelessly transmit the environmental information to a remote server and wirelessly receiving an instruction from the remote server.

6. The irrigation system of claim 5, wherein the instruction is determined by the remote server based on the environmental information related to the farm and environmental information related to other farms associated with the irrigation system.

7. The irrigation system of claim 5, wherein the control unit further comprises
a controller configured to control an openness of the gate based on the degree of openness and the instruction from the remote server.

8. The irrigation system of claim 7, wherein the degree of openness of the gate is further detected based on ultrasound.

9. The irrigation system of claim 5, wherein the communication module communicates with the remote server based on long range wide area network (LoRaWAN) or narrow band-Internet of Things (NB-IoT).

10. The irrigation system of claim 1, the environmental information comprises at least one of the following information related to the farm:
an air temperature;
an air humidity;
a soil moisture;
an air pressure;
a wind power; and
a water level.

11. The irrigation system of claim 1, wherein the at least one sensor is configured to detect the environmental information related to the farm.

12. An irrigation system for irrigating a plurality of pieces of land, comprising:
a plurality of gates each of which is configured to adjust a water flow for irrigating a respective one of the plurality of pieces of land, which is a farm that includes a plurality of areas connected with a water channel, wherein the water channel has a water flow that is adjustable by a corresponding one of the plurality of gates;
a plurality of control units each of which is configured to control a respective one of the plurality of gates to adjust the water flow based on environmental information related to the plurality of pieces of land, wherein each of the plurality of control units is a microcontroller unit (MCU) comprising at least one sensor contained within the MCU, and wherein each of the at least one sensors comprises a respective laser sensor configured to detect a respective degree of openness of the respective one of the plurality of gates;
a plurality of water level gauges each of which is configured to measure a water level of a respective one of the plurality of areas; and
a plurality of water valves each of which is configured to irrigate a respective one of the plurality of areas using water from the water channel based on the water level,
wherein at least one of the plurality of water level gauges has a surface aligner configured to detect a surface level of the Earth in the respective one of the plurality of areas, wherein the water level of the respective one of the plurality of areas is measured based on the surface level.

13. The irrigation system of claim 12, wherein each of the plurality of gates is either a swing gate or a slide gate.

14. The irrigation system of claim 12, wherein each of the plurality of control units has a radio-frequency identification (RFID) for a local user to control irrigation of a respective one of the plurality of pieces of land.

15. The irrigation of claim 12, further comprising:
a remote monitor that monitors the environmental information in real-time.

16. The irrigation of claim 12, wherein the at least one sensor is configured to detect the environmental information related to the respective one of the plurality of pieces of land.

17. An irrigation system, comprising:
a gate configured to adjust a water flow for irrigating a farm that includes a plurality of areas connected with a water channel, wherein the water channel has a water flow that is adjustable by the gate;
a control unit configured to control the gate to adjust the water flow based on environmental information related to the farm, wherein the control unit comprises a communication module configured to wirelessly transmit the environmental information to a remote server and wirelessly receiving an instruction from the remote server, and wherein the control unit is a microcontroller unit (MCU) comprising at least one sensor contained within the MCU, and wherein the at least one sensor comprises a laser sensor configured to detect a degree of openness of the gate;
a plurality of water level gauges each of which is configured to measure a water level of a respective one of the plurality of areas;
a solar panel;
a battery charged with energy from the solar panel to provide energy to the motor; and
a plurality of water valves each of which is configured to irrigate a respective one of the plurality of areas using water from the water channel based on the water level, wherein at least one of the plurality of water level gauges has a surface aligner configured to detect a surface level of the Earth in the respective one of the plurality of areas, wherein the water level of the respective one of the plurality of areas is measured based on the surface level.

18. The irrigation system of claim 17, further comprising:
an elevator configured to move the gate; and
a motor configured to drive the elevator, wherein the elevator and the motor are designed to have a power-to-weight ratio less than about 0.05 W/kg.

19. The irrigation system of claim 17, wherein the instruction is determined by the remote server based on the environmental information related to the farm and environmental information related to other farms associated with the irrigation system.

20. The irrigation system of claim 17, wherein the control unit further comprises a controller configured to control an openness of the gate based on the degree of openness and the instruction from the remote server.

* * * * *